(12) United States Patent
Lee et al.

(10) Patent No.: US 9,810,833 B2
(45) Date of Patent: Nov. 7, 2017

(54) DISPLAY APPARATUS HAVING FOLDED LIGHT GUIDE MEMBER

(71) Applicant: Samsung Display Co., Ltd., Yongin-Si, Gyeonggi-Do (KR)

(72) Inventors: Luly Lee, Yongin-si (KR); Sojeong La, Suwon-si (KR); Young-min Park, Hwaseong-si (KR); Donghyeon Lee, Seoul (KR); Jaesang Lee, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 104 days.

(21) Appl. No.: 15/008,755

(22) Filed: Jan. 28, 2016

(65) Prior Publication Data

US 2016/0282550 A1    Sep. 29, 2016

(30) Foreign Application Priority Data

Mar. 26, 2015    (KR) .................. 10-2015-0042384

(51) Int. Cl.
*F21V 15/00*    (2015.01)
*F21V 8/00*    (2006.01)

(52) U.S. Cl.
CPC .......... *G02B 6/0088* (2013.01); *G02B 6/0038* (2013.01); *G02B 6/0055* (2013.01); *G02B 6/0068* (2013.01); *G02B 6/0083* (2013.01)

(58) Field of Classification Search
CPC .. G02B 6/0088; G02B 6/0038; G02B 6/0055; G02B 6/0068; G02B 6/0083

USPC .......... 362/613; 361/749; 345/1.1, 156, 173, 345/181, 211; 315/211, 212, 204

See application file for complete search history.

(56) References Cited

U.S. PATENT DOCUMENTS

| 9,626,938 | B2 * | 4/2017 | Abe ....................... G09G 5/363 |
| 2014/0254111 | A1 * | 9/2014 | Yamazaki ........... H01L 51/0097 361/749 |
| 2017/0077211 | A1 * | 3/2017 | Yamazaki ........... H01L 51/0097 |
| 2017/0097726 | A1 * | 4/2017 | Abe ....................... G06F 3/0416 |

FOREIGN PATENT DOCUMENTS

| JP | 4765897 B2 | 6/2011 |
| JP | 5426744 B2 | 12/2013 |
| KR | 1020080057595 A | 6/2008 |
| KR | 1020090045977 A | 5/2009 |
| KR | 1020120011185 A | 2/2012 |
| KR | 1020120132609 A | 12/2012 |

* cited by examiner

*Primary Examiner* — Karl D Frech
(74) *Attorney, Agent, or Firm* — Cantor Colburn LLP

(57) ABSTRACT

A display device includes a curved display panel and a backlight unit. The backlight unit includes a light guide film and a light source unit. The light guide film defines: a light emission part thereof facing the display panel, a folding part thereof extending from the light emission part to be folded in a folded state of the light guide film, and a light incident part thereof extending from the folding part to face the display panel with the light emission part therebetween, The light incident part is extended at a first end thereof from the folding part and defines a light incident surface of the light guide film at a second end of the light incident part opposite to the first end thereof. The light source unit is overlapped with the light emission part and face the light incident surface.

17 Claims, 8 Drawing Sheets

DISPLAY APPARATUS HAVING FOLDED LIGHT GUIDE MEMBER

This application claims priority to Korean Patent Application No. 10-2015-0042384, filed on Mar. 26, 2015, and all the benefits accruing therefrom under 35 U.S.C. §119, the entire contents of which are hereby incorporated by reference.

BACKGROUND

The invention relates to a display apparatus, and more particularly, to a curved display apparatus.

Flat panel display devices such as a liquid crystal display device and an organic electroluminescent display device are used in data processing devices such as a television ("TV"), a display monitor, a notebook and a mobile phone to display an image.

Curved display devices as applications of the flat panel display devices have been developed. The curved display devices may define a display area having a curved shape to provide users with an image having improved three-dimensional effects and a sense of immersion.

SUMMARY

One or more exemplary embodiment of the invention provides a slim display apparatus. One or more exemplary embodiment of the invention also provides a display apparatus having improved display quality.

An exemplary embodiment of the invention provides a display apparatus including a display panel which is curved and displays an image, and a backlight unit which generates and provides light to the display panel.

The backlight unit includes a light guide film and a light source unit which provides the light to the light guide film. The light guide film defines a light emission part thereof, a folding part thereof and a light incident part thereof.

The light emission part faces the display panel. The light emission part may define a light emission surface of the light guide film which faces the display panel and through which light is emitted from the light guide film, and an opposite surface opposite to the light emission surface. The light emission part may be curved along the shape of the display panel.

The folding part extends from the light emission part to be folded in a folded state of the light guide film. The light incident part extends from the folding part to face the display panel with the light emission part therebetween. The light incident part extends at a first end thereof from the folding part and defines a light incident surface of the light guide film at a second end of the light incident part opposite to the first end thereof. The light incident part may be curved along the shape of the display panel.

The light source unit is overlapped with the light emission part and face the light incident surface. The light source unit may include a plurality of light sources, each of which emits the light through an emission surface thereof, and a printed circuit board on which the plurality of light sources is mounted. The emission surface may face the light incident surface of the light guide film which is defined by the light incident part thereof.

The folding part defined by the light guide film may include a first folding part and a second folding part. The first folding part may be connected to a first end of the light emission part, and the second folding part may be connected to a second end of the light emission part opposite to the first end thereof.

The light incident part defined by the light guide film may include a first light incident part and a second light incident part. The first light incident part may extend at a first end thereof from the first folding part to be overlapped with the light emission part. The second light incident part may extend at a first end thereof from the second folding part to be overlapped with the light emission part. A second end of the second light incident part opposite to the first end thereof is spaced apart from a second end of the first light incident part opposite to the first end thereof.

The light incident surface of the light guide film defined by the light incident part thereof may include the first light incident surface defined by a second end surface of the first light incident part, and the second light incident surface defined by a second end surface of the second light incident part. The first light incident surface and the second light incident surface may be spaced apart each other and face each other.

The light source unit may be disposed between the second ends of the first light incident part and the second light incident part which are spaced apart from each other.

The light source unit may include a first light source unit and a second light source unit. The first light source unit may generate and provide first light to the first light incident surface. The second light source unit may be disposed between the second light incident surface and the first light source unit to generate and provide second light to the second light incident surface.

The backlight unit may further include a reflection sheet facing the light emission part which is defined by the light guide film. The reflection sheet facing the light emission part which is defined by the light guide film is disposed between the light emission part and the light incident part and between the light emission part and the light source unit. The reflection sheet may be curved along a shape of the light emission part.

The folding part which is defined extending from the light emission part to be folded may have a curvature. The light guide film has a thickness in a cross-section thereof. A ratio of the curvature of the folding part to the thickness of the light guide film is equal to or greater than about 10. The light guide film may have flexibility.

The display apparatus may further include a bottom chassis which accommodates the backlight unit therein and is curved along a shape of the display panel. The bottom chassis may include a bottom part facing the display panel, and a sidewall part bent from the bottom part and facing the folding part.

The backlight unit may further include a reflection member disposed between the bottom chassis and the light source unit. The reflection member which is disposed between the bottom chassis and the light source unit may have a shape which is curved along the shape of the display panel.

The light emission part which is defined by the light guide film may define a light emission surface of the light guide film through which light is emitted from the light guide film, the light emission surface facing the display panel, and an opposite surface of the light guide film opposite to the light emission surface. A light guide pattern may be defined at the opposite surface. The light guide pattern may be a groove defined recessed in the opposite surface.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
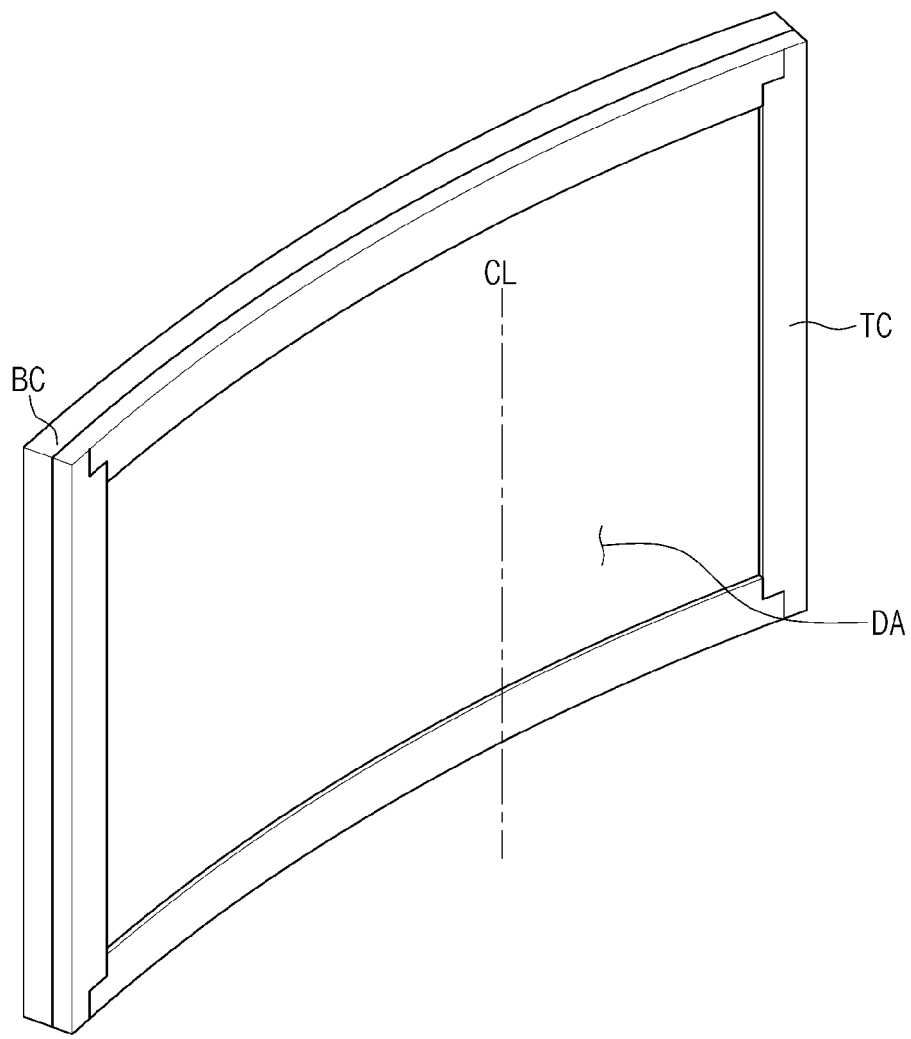
FIG. 1 is a perspective view of an exemplary embodiment of a display apparatus according to the invention.

Exemplary embodiments of the invention will be described below in more detail with reference to the accompanying drawings. The invention may, however, be embodied in different forms and should not be construed as limited to the exemplary embodiments set forth herein. Rather, the invention should be understood to be intended to include the structural and functional equivalents of the matter.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." The meaning of "include," "comprise," "including," or "comprising," specifies features, integers, steps, operations, elements, components or combinations thereof listed in the specification but does not exclude other features, integers, steps, operations, elements, components or combinations thereof.

In the following description, it will be understood that when a layer (or film), region or substrate is referred to as being 'on' another layer (or film), region or substrate, it can be directly on the other layer or substrate, or intervening layers may also be present. In the following description, it will be understood that when a layer, region or substrate is referred to as being 'under' another layer, region or substrate, it can be directly under the other layer, region or substrate, or intervening layers may also be present.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Like reference numerals refer to like elements throughout. In the figures, the dimensions of layers and regions are exaggerated for clarity of illustration. It will be understood that although the terms first and second are used herein to describe various elements, these elements should not be limited by these terms. These terms are used only to differentiate one component from another one. For example, without departing from the scope of the invention, a first element could be termed a second element, and similarly a second element could be termed a first element. The terms of a singular form may include plural forms unless referred to the contrary.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments will be described in detail with reference to the accompanying drawings.

Figure 2:
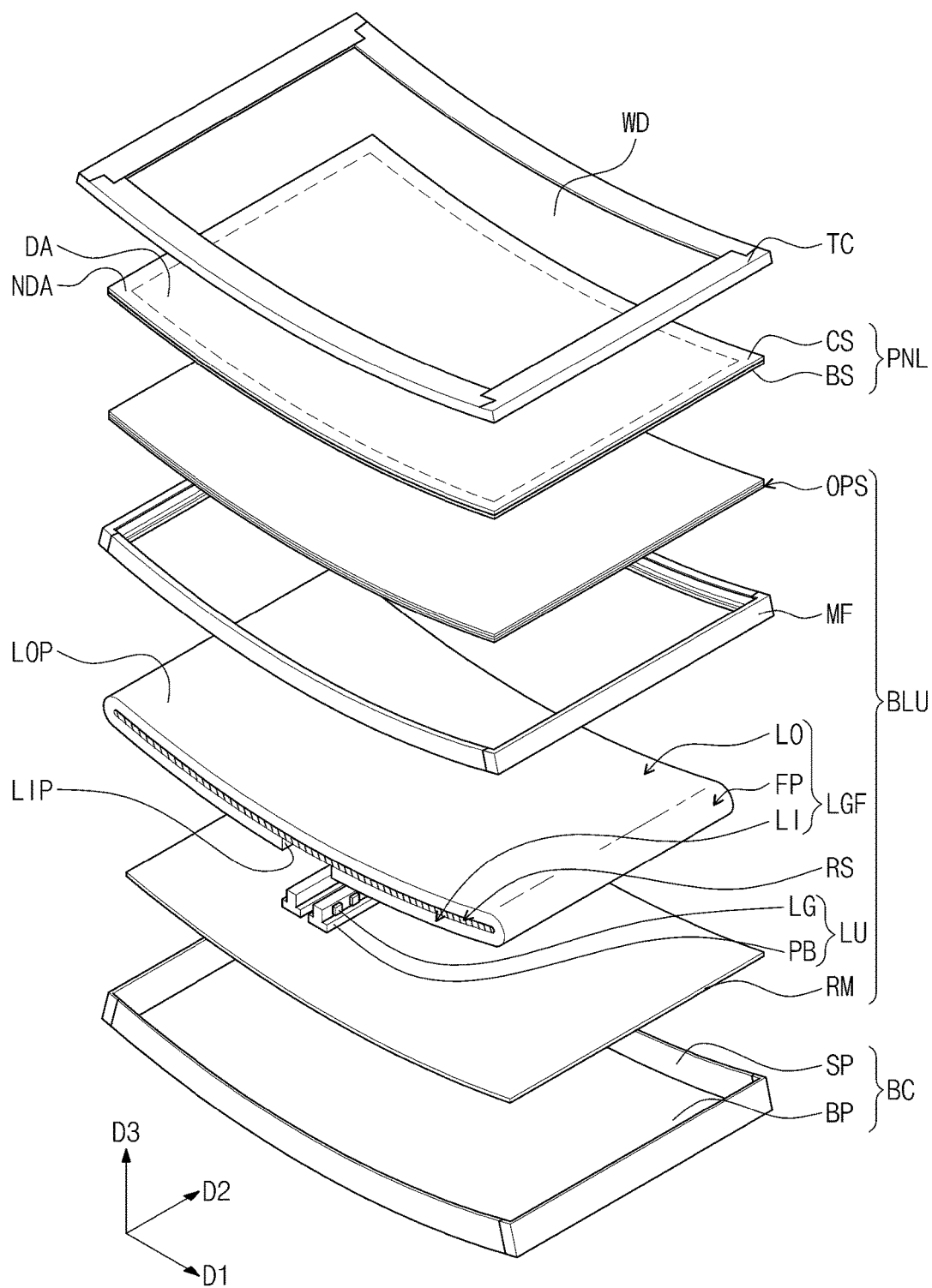
FIG. 2 is an exploded perspective view of the display apparatus in FIG. 1.
Figure 3:
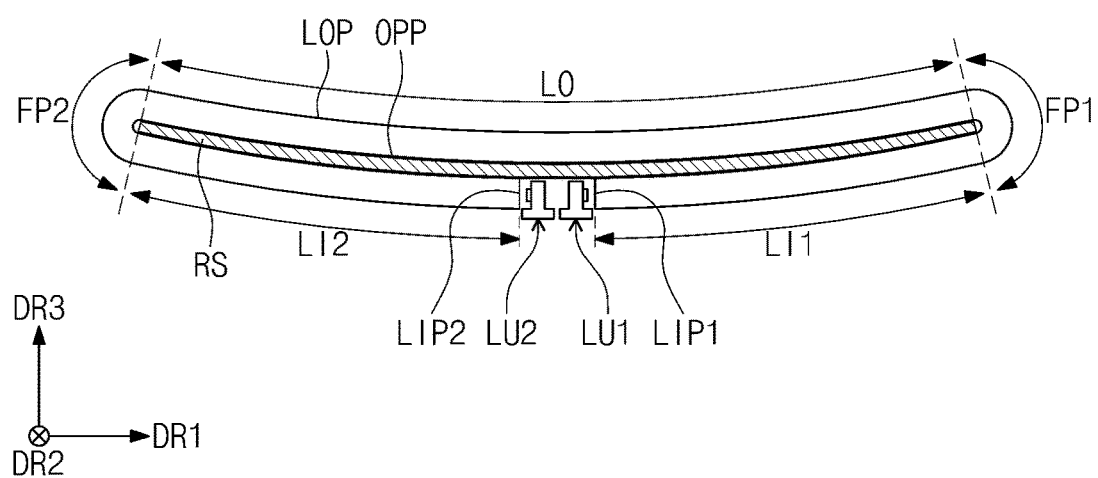
FIG. 3 is a partial cross-sectional view of an exemplary embodiment of a backlight unit in FIG. 2.

FIG. 1 is an exploded perspective view of an exemplary embodiment of a display apparatus according to the invention, and FIG. 2 is an exploded perspective view of the display apparatus in FIG. 1. FIG. 3 is a cross-sectional view illustrating an exemplary embodiment of a light guide film and a light source in FIG. 2.

Referring to FIGS. 1 and 2, the display apparatus a curved shape. In more detail, the display apparatus has a curved concave shape with respect to a first direction DR1 to have a predetermined radius of curvature. The display apparatus has a display area DA curved with respect to a center line CL parallel to a second direction DR2. The display area DA is disposed in a plane defined by the first direction DR1 and the second direction DR2 which crosses the first direction DR1.

The display apparatus includes a display panel PNL, a top chassis TC, a bottom chassis BC and a backlight unit BLU.

The display panel PNL displays an image. Although the display panel PNL illustrated in FIGS. 1 and 2 is described as a non-emissive display panel such as a liquid crystal display panel, an electrowetting display panel, an electrophoretic display panel, a microelectromechanical system display panel and the like, the kind of the display panel PNL is not limited thereto. In an exemplary embodiment, for example, the display panel PNL may be a self-emissive display panel such as an organic electroluminescent display panel or a plasma display panel. As the self-emissive display panel, the organic electroluminescent display panel and the plasma display panel may self-generate light to display an image. For convenience of description, the liquid crystal display panel will be described as the display panel PNL in exemplary embodiments of the invention.

The display panel PNL has an overall rectangular shape having a pair of long sides and a pair of short sides. Here, an extension direction of the long side is in the first direction DR1, and an extension direction of the short side is in the second direction DR2.

According to an embodiment of the invention, the display panel PNL is concavely curved along the first direction DR1. Especially, when the display panel PNL is cut along the first direction DR1 to be viewed in the second direction DR2, the display panel PNL may have a cross-section curved concavely in a downward direction to have a predetermined radius of curvature. The radius of curvature as described herein represents a radius of curvature when a plane is cut in a direction perpendicular to the plane along a curved direction. Although the display panel PNL illustrated in FIGS. 1 and 2 is provided in a curved shape along the first direction DR1, the invention is not limited thereto. In an exemplary embodiment, the display panel PNL may be provided in a curved shape along the second direction DR2 or along both the first and second directions DR1 and DR2.

The display panel PNL may include a display area DA on which the image is displayed, and a non-display area NDA which is provided at one or more sides of the display area DA. With reference to FIGS. 1 and 2, the display area DA of the display panel PNL corresponds or defines the display area DA of the display apparatus.

The display panel PNL includes a base display substrate BS, a counter display substrate CS facing the base display substrate BS, and a liquid crystal layer (not shown) disposed between the base display substrate BS and the counter display substrate CS. The display panel PNL has an edge covered by the top chassis TC. According to an exemplary embodiment of the invention, the base display substrate BS may include therein a plurality of pixel electrodes (not shown), and a plurality of thin film transistors (not shown) which is electrically connected to the pixel electrodes in one-to-one correspondence. Each of the thin film transistors switches a driving signal provided to the corresponding pixel electrode. The counter display substrate CS may include therein a common electrode (now shown) which forms an electric field that controls orientations of the liquid crystals, together with the pixel electrodes. The display panel PNL drives the liquid crystal layer to display an image in a third direction DR3 which is perpendicular to the first direction DR1 and the second direction DR2.

The top chassis TC is disposed on the display panel PNL. The top chassis TC covers a front edge of the display panel PNL, that is, the non-display area NDA of the display panel PNL. The top chassis TC includes defined thereby a display window WD exposing the display area DA of the display panel PNL. The top chassis TC may include any of a number of various materials such as plastic, aluminum or stainless steel. The top chassis TC may be curved along the shape of the display panel PNL.

The bottom chassis BC may be disposed under the backlight unit BLU to accommodate the backlight unit BLU therein. The bottom chassis BC may include defined thereby a bottom part BP facing a rear side of the display panel PNL, and a sidewall part SP which is bent and extend from the bottom part BP. The bottom chassis BC may have the predetermined radius of curvature, and be curved along the shape of the display panel PNL.

The backlight unit BLU functions to generate and provide light to the display panel PNL and is disposed under the display panel PNL. The backlight unit BLU may include a mold frame MF, optical sheets OPS, a light guide film LGF and a light source unit LU.

The mold frame MF may be disposed along an edge of the display panel PNL to support the display panel PNL from a lower portion of the display panel PNL. The mold frame MF may support thereon the optical sheets OPS disposed under the display panel PNL. The mold frame MF may include a fixing member, e.g., a catch protrusion (not shown), for fixing or supporting a portion of the display panel PNL, the optical sheets OPS or other components such as the light source unit LU, within the display apparatus. The mold frame MF may have the predetermined radius of curvature as being curved along the shape of the display panel PNL.

The optical sheets OPS may be disposed between the display panel PNL and the bottom chassis BC. The optical sheets OPS control light emitted from the light source unit LU. The optical sheets OPS may include a diffusion sheet, a prism sheet and a protection sheet, which are stacked in sequence, but the invention is not limited thereto.

The diffusion sheet diffuses the light. The prism sheet collects the light diffused by the diffusion sheet in a direction perpendicular to the plane of the display panel PNL disposed thereabove. Most of light transmitted through the prism sheet is incident perpendicular to the display panel PNL. The protection sheet is disposed on the prism sheet. The protection sheet protects the prism sheet from an external shock applied thereto. Although the optical sheets OPS include one of each of the diffusion sheet, the prism sheet and the protection sheet in the illustrated exemplary embodiment, the invention is not limited thereto. In an exemplary embodiment, for example, the optical sheets OPS may include a plurality of at least one of the diffusion sheet, the prism sheet and the protection sheet or the optical sheets OPS may omit at least one of the diffusion sheet, the prism sheet and the protection sheet. The diffusion sheet, the prism sheet and the protection sheet may be stacked in an order differing from that described herein. The optical sheets OPS may have the predetermined radius of curvature as being curved along the shape of the display panel PNL.

Referring to FIGS. 2 and 3, the light guide film LGF is disposed between the optical sheets OPS and the bottom chassis BC to guide light provided from the light source unit LU toward the display panel PNL. Portions of the light guide film LGF may define a light emission part LO thereof, a folding part FP thereof and a light incident part LI thereof.

The light emission part LO of the light guide film LGF faces the display panel PNL to overlap the display panel PNL. The light emission part LO corresponds to the shape of the display panel PNL and is curved along the shape of the display panel PNL. The light emission part LO has the predetermined radius of curvature as being curved along the shape of the display panel PNL. The light emission part LO defined by the light guide film LGP includes and defines a light emission surface LOP which faces the display panel PNL and through which light is emitted towards the display panel PNL, and an opposite surface OPP which is opposite to the light emission surface LOP.

The light guide film LGF extends from a side or end of the light emission part LO to define the folding part FP. The folding part FP may face the sidewall part SP of the bottom chassis BC in an assembled state of the display apparatus.

According to an exemplary embodiment of the invention, the folding part FP may include a first folding part FP1 and a second folding part FP2. Taken along the second direction DR2, the first folding part FP1 is connected to a first end of the light emission part LO. Taken along the second direction DR2, the second folding part FP2 is connected to a second end of the light emission part LO opposite to the first end of the light emission part LO.

The light guide film LGF extends from a side or end of the folding part FP to define the light incident part LI which faces the opposite surface OPP of the light emission part LO. The light incident part LI may be overlapped with at least a portion of the light emission part LO in a top plan view. The light incident part LI is connected to the folding part FP at a first end thereof. The light incident part LI defined by the light guide film LGF includes and defines a light incident surface LIP at a second end of the light incident part LI opposite to the first end thereof at which the light incident part LI is connected to the folding part FP. The light incident surface LIP is defined at a distal end of the light incident part LI. The light incident part LI is curved along the shape of the light emission part LO. The light incident part LI may have the predetermined radius of curvature as being curved along the shape of the display panel PNL.

According to an exemplary embodiment of the invention, the light incident part LI may include a first light incident part LI1 connected at the first end thereof to the first folding part FP1, and a second light incident part LI2 connected at the first end thereof to the second folding part FP2. The light incident surface LIP may include a first light incident surface LIP1 which is defined by the first light incident part LI1 and disposed opposite to the first end of the first light incident part LI1 at which the first folding part FP1 is connected, and a second light incident surface LIP2 which is defined by the second light incident part LI2 and disposed opposite to the first end of the second light incident part LI2 at which the second folding part FP2 is connected. The first light incident part LI1 and the second light incident part LI2 are spaced a predetermined distance in the first direction DR1. The first light incident surface LIP1 and the second light incident surface LIP2 are spaced a predetermined distance from each other and face each other.

The light source unit LU is disposed between the light guide film LGF and the bottom chassis BC. The light source unit LU is overlapped with the light emission part LO defined by the light guide film LGF and faces the light incident surface LIP defined by the light guide film LGF.

According to an exemplary embodiment of the invention, the light source unit LU includes a plurality of light sources LG which generates and emits the light, and a printed circuit board PB on which the plurality of light sources LG are mounted.

In a length direction of the printed circuit board PB, the plurality of light sources LG are spaced apart each other and arranged on the printed circuit board PB. Each of the plurality of light sources LG emits light generated thereby through an emission surface thereof. The emission surface may be parallel with the light incident surface LIP defined by the light guide film LGF to be disposed facing the light incident surface LIP.

The printed circuit board PB may extend in a length direction thereof in the second direction DR2.

Although a surface of the printed circuit board PB, on which the plurality of light sources LG is mounted, is parallel to the emission surface LOP in the illustrated exemplary embodiment of the invention, the invention is not limited thereto. In an exemplary embodiment, for example, the surface of the printed circuit board PB, on which the plurality of light sources LG is mounted, may be perpendicular to the emission surface LO. The printed circuit board PB may further define a supporting surface thereof which is perpendicular to the surface on which the light sources LG are mounted and which is parallel to the bottom part BP of the bottom chassis BC.

The light source unit LU may further include a heat-dissipating member (not shown) connected to a surface of the printed circuit board PB. The heat-dissipating member may support thereon the printed circuit board PB and release heat generated from the printed circuit board PB to the outside thereof.

According to an exemplary embodiment of the invention, the light source unit LU is disposed between the first light incident part LI1 and the second light incident part LI2. The light source unit LU may include a first light source unit LU1 generating and providing first light to the first light incident surface LIP1, and a second light source unit LU2 generating and providing second light to the second light incident surface LIP2.

The first light source unit LU1 and the second light source unit LU2 may be disposed parallel to each other between the first light incident surface LIP1 and the second light incident surface LIP2. The first light source unit LU1 and the second light source unit LU2 may be overlapped with a central portion of the display panel PNL in the top plan view.

According to an exemplary embodiment of the invention, the backlight unit BLU may further include a reflection sheet RS which faces the light emission part LO defined by the light guide film LGF. The reflection sheet RS is disposed between the light emission part LO and the light incident part LI defined by the light guide film LGF and is disposed between the light emission part LO defined by the light guide film LGF and the light source unit LU.

The reflection sheet RS has an upper surface contacting the opposite surface OPP of the light emission part LO. The reflection sheet RS has a lower surface, which is opposite to the upper surface thereof and contacts a surface of the first light incident part LI1 and the second light incident part LI2 extended from the opposite surface OPP of the light emission part LO. The surfaces of the first light incident part LI1 and the second light incident part LI2 which are extended from the opposite surface OPP of the light emission part LO do not overlap the light source unit LU.

The reflection sheet RS may be curved along the shape of the light emission part LO. The reflection sheet RS may have the predetermined radius of curvature as being curved along the shape of the display panel PNL. The reflection sheet RS may include a light reflecting material such as polyethylene terephthalate ("PET") or aluminum (Al). The reflection sheet RS may reflect light that is not emitted from the light emission part LO and is leaked to the reflection sheet RS through the opposite surface OPP, thereby allowing the reflected light to be re-incident to the light emission part LO. Since the reflection sheet RS is provided, loss of light provided to the display panel PNL may be reduced.

Referring to FIG. 2 again, the backlight unit BLU may further include a reflection member RM of which portions thereof are disposed between the light source unit LU and the bottom chassis BC and between the light guide film LGF and the bottom chassis BC. The reflection member RM may include a light reflecting material such as polyethylene terephthalate ("PET") or aluminum (Al). The reflection member RM may be curved along the shape of the display panel PNL. The reflection member RM may reflect light that is emitted from the light source unit LU and not incident into the light guide film LGF (e.g., leaked) and allow the reflected light to be re-incident to the light guide film LGF again. Since the reflection member RM is provided, the loss of light provided to the display panel PNL may be reduced.

Figure 4A:
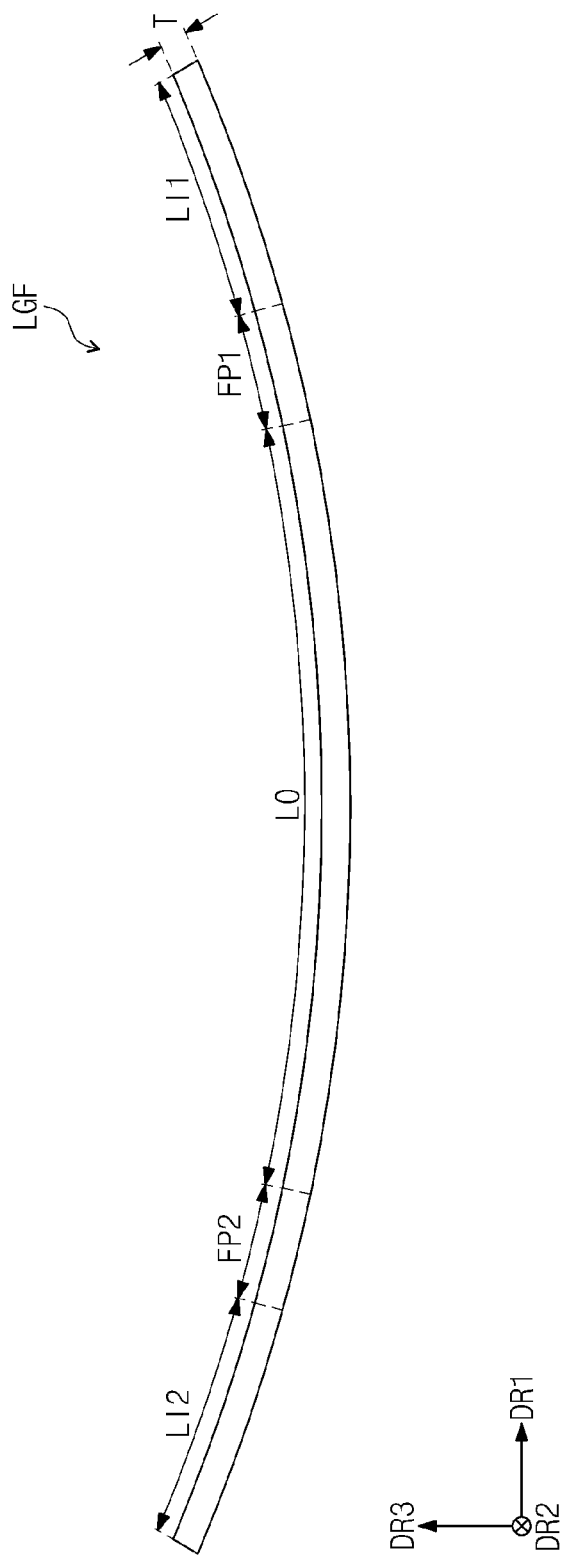
FIGS. 4A to 4C are cross-sectional views of a light guide film with respect to an exemplary embodiment of a process of folding the light guide film according to the invention.
Figure 4B:
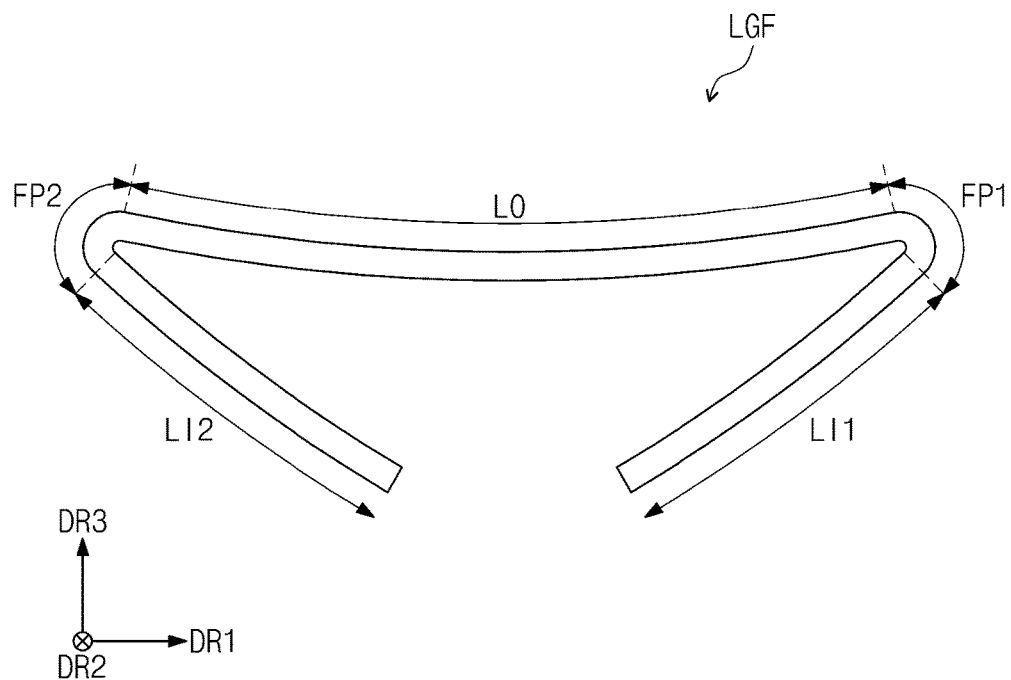
Figure 4C:
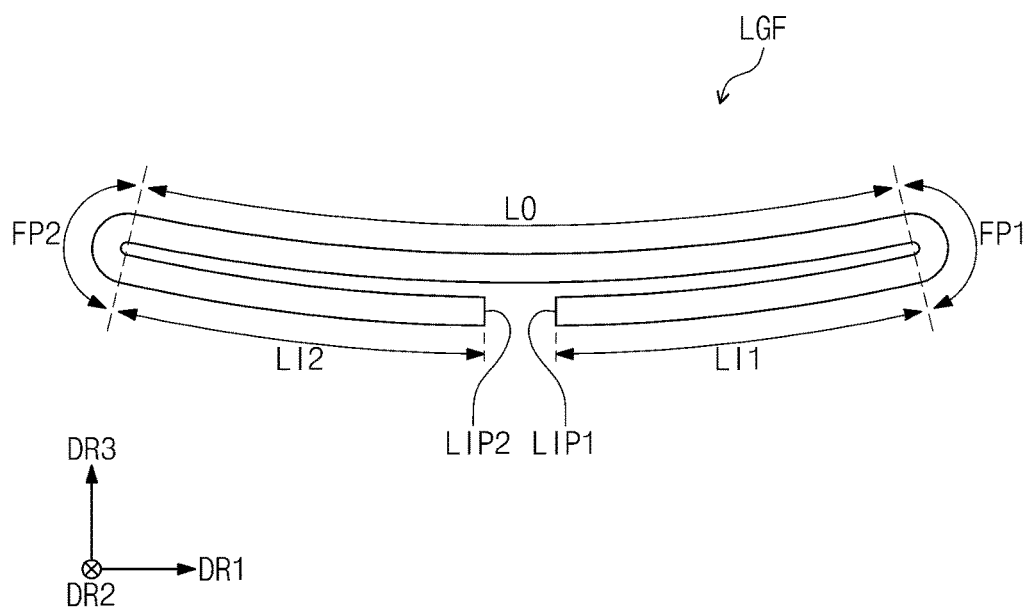

FIGS. 4A to 4C are cross-sectional views of a light guide film with respect to an exemplary embodiment of a process of folding the light guide film according to the invention. Hereinafter, for convenience of description, duplicate descriptions that have made in the previous exemplary embodiment of the invention will not be provided herein.

Referring to FIGS. 4A to 4C, the light guide film LGF according to an exemplary embodiment of the invention has flexibility. The light guide film LGF may have the shape of a film with a relatively small thickness (third direction DR3) as compared to a planar dimension (defined in DR1 and DR2) thereof. Referring to FIG. 4A, the light guide film LGF is curved in the first direction DR1 in a curved state thereof. In the curved state, there are no overlapping portions of the light guide film in the third direction DR3. A thickness T of the light guide film may be taken in the third direction DR3.

Referring to FIG. 4B, the first folding part FP1 and the second folding part FP2 defined by the light guide film LGF are gradually bent from opposing ends of the light emission part LO. Referring to FIG. 4C, the first folding part FP1 and the second folding part FP2 are further bent to dispose the first folding part FP1 and the second folding part FP2 in a folded state thereof such that the first light incident part LI1 and the second light incident part LI2 are parallel to the light emission part LO. Here, the first light incident surface LIP1 and the second light incident surface LIP2 respectively defined by the first light incident part LI1 and the second light incident part LI2 face each other.

In the folded state of the folding part FP, the first light incident part LI1 and the second light incident part LI2 are spaced a predetermined distance from the light emission part LO in the third direction DR3 and are disposed parallel to each other. Here, the first light incident part LI1 and the second light incident part LI2 may be spaced apart from each other in the third direction by a thickness of the reflection sheet RS (refer to FIG. 3).

Figure 5:
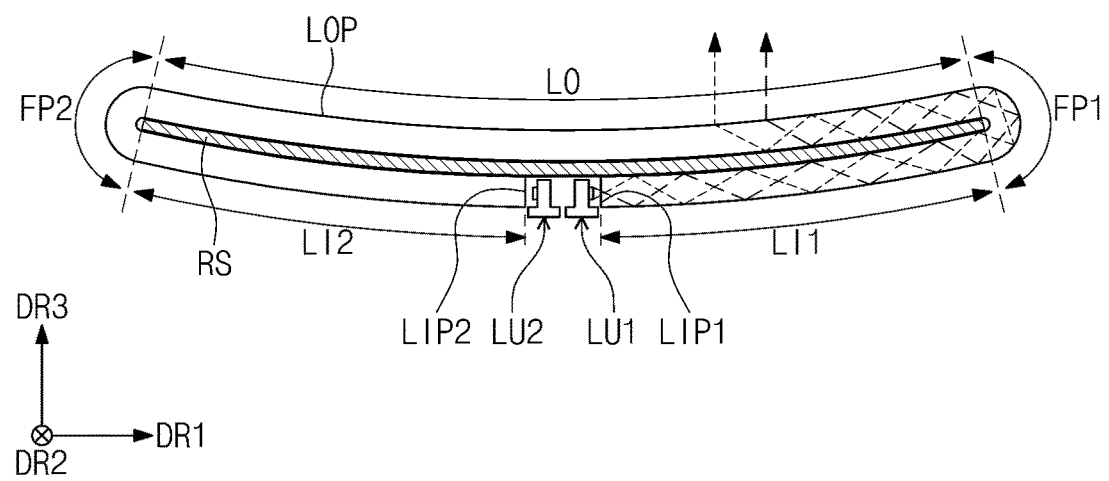
FIG. 5 is a partial cross-sectional view of a moving path of light within an exemplary embodiment of a folded light guide film according to the invention.

FIG. 5 is a partial cross-sectional view of a moving path of light within an exemplary embodiment of a folded light guide film according to the invention.

Referring to FIG. 5, first light (indicated by a dotted line) generated by and emitted from the first light source unit LU1 is incident to the first light incident part LI1. The first light moves within the folded light guide film LGF from the first incident surface LI1 to the light emission part LO defined by portions of the light guide film LGF. Here, the first light may move within the folded light guide film LGF by being totally reflected by the first incident part LI1 defined by the light guide film LGF. The first light transferred from the first incident surface LI1 to the light emission part LO may be emitted outside the light guide film LGF through the light emission surface LOP defined by the light guide film LGF.

In a similar manner to that described above for the first light, the second light (not shown) generated by and emitted from the second light source unit LU2 may be transferred within the folded light guide film LGF from the second light incident part LI2 to the light emission part LO defined by portions of the light guide film LGF. The second light transferred from the second incident surface LI1 to the light emission part LO may be emitted outside the light guide film LGF through the light emission surface LOP defined by the light guide film LGF.

In a conventional display apparatus, a light source unit is disposed at a central portion of the display apparatus so as to reduce the thickness of the display apparatus, especially the thickness of the display apparatus at a side surface of the display apparatus. Accordingly, two light guide members spaced from each other with the light source unit disposed therebetween are used in the conventional display apparatus. As a result, a dark region is viewable by a user at a portion of the display apparatus at which the light source unit is disposed, that is, at a portion on which the light guide members spaced apart from each other are not disposed.

However, one or more exemplary embodiment of the display apparatus according to the invention may provide light uniformly to a whole of the display area DA of the display apparatus because the light guide film LGF is disposed overlapping the light source unit LU even though the light source unit is accommodated at spaced apart portions of the light guide film disposed at the central portion of the display apparatus.

As the light guide film LGF has the shape of a thin film, the light guide film LGF may have a thickness less than that of the conventional light guide member even when portions of the light guide film LGF overlap each other. Accordingly, although the light source unit LU is disposed at the central portion of the display apparatus, an overall thickness of the display apparatus may be decreased at a side surface thereof which reduces or effectively prevents reduction in display quality of the display apparatus at the same time.

Figure 6:
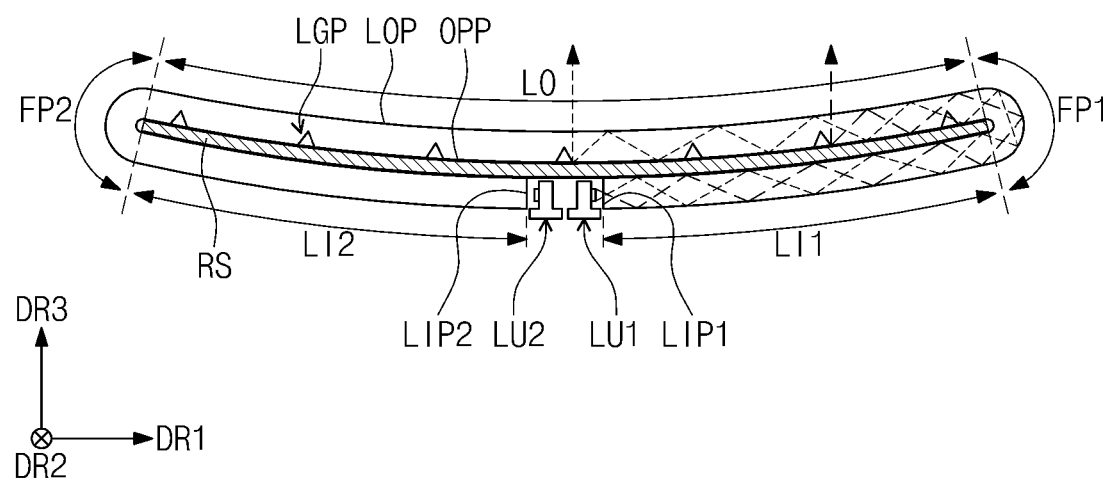
FIG. 6 is a partial cross-sectional view of another exemplary embodiment of a backlight unit according to the invention.

FIG. 6 is a partial cross-sectional view of another exemplary embodiment of a backlight unit according to another embodiment of the invention. Hereinafter, for convenience of description, duplicate descriptions that have made in the previous embodiment of the invention will not be provided herein.

Referring to FIG. 6, the light guide film LGF may define an opposite surface OPP at which a light guide pattern LGP is disposed. The light guide pattern LGP may be one or more grooves extended from the opposite surface OPP in a light emission direction. Although the light guide pattern LGP is illustrated as a groove recessed from the opposite surface OPP, the invention is not limited thereto. In an exemplary embodiment, the light guide pattern LGP may be one or more patterns defined by ink or the like disposed such as by printed on the opposite surface OPP.

Since the light guide pattern LGP is disposed at the opposite surface OPP defined by the light guide film LGF, an emission angle of light emitted through the light emission surface LOP may be adjusted by the light guide pattern LGP. Where the emission angle of the light emitted through the light emission surface LOP is adjusted by the light guide pattern LGP, the light emission efficiency of the backlight unit BLU may be enhanced.

Figure 7:
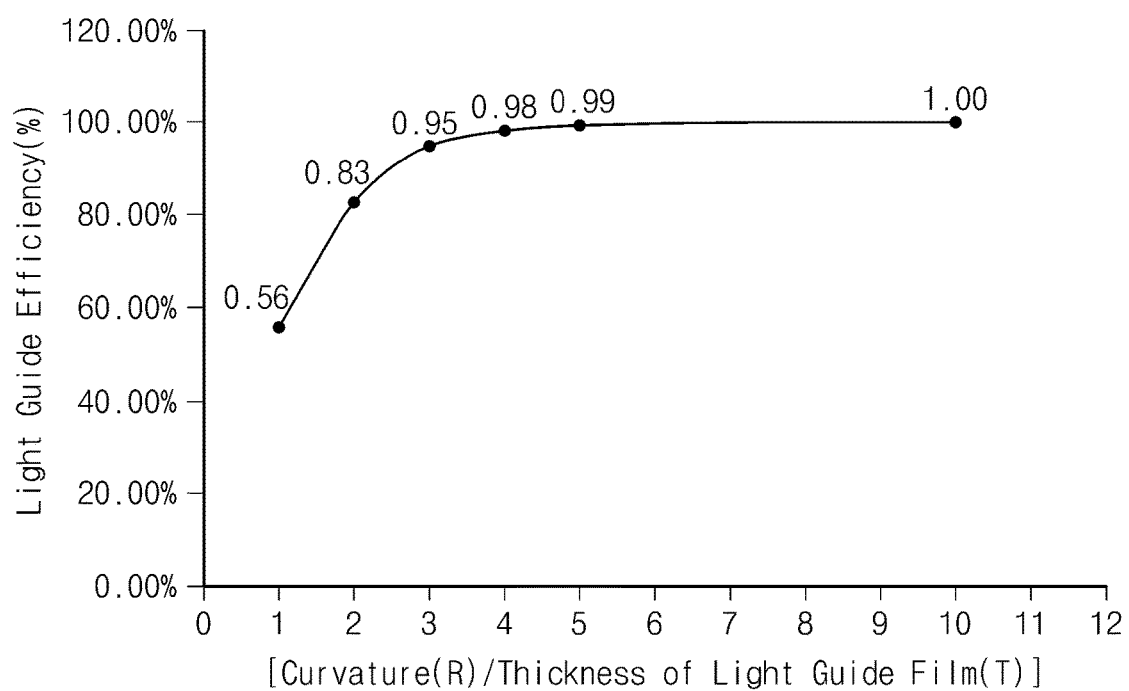
FIG. 7 is a graph showing a light guide efficiency in percent (%) versus a ratio of a curvature of a folding part of a light guide film to a thickness of the light guide film.

FIG. 7 is a graph showing a light guide efficiency in percent (%) versus a ratio of a curvature of a folding part of a light guide film to a thickness of the light guide film.

Referring to FIG. 7, it can be seen that the light guide efficiency (%) varies with the thickness of the light guide film and the curvature R of the folding part defined by the light guide film. FIG. 7 is a graph representing the light guide efficiency (%) of the folding part with respect to ratios of a curvature R of a folding part of a light guide film to a thickness T of the light guide film where the curvature R of the folding part is about 0.1 millimeters (mm), about 0.2 mm, about 0.3 mm, about 0.4 mm, about 0.5 mm and about 1 mm, when the light guide film has a thickness T of about 0.1 mm. Referring to FIG. 4A, the thickness T of the light guide film is taken in the third direction DR3.

When the folding part has a curvature R of about 0.1 mm, the light guide efficiency (%) of the folding part is about 56% (0.56 in FIG. 7). That is, it can be seen that a remaining portion of the light (about 44%) is lost in the folding part. When the folding part has a curvature R of about 0.2 mm, the light guide efficiency (%) of the folding part is about 83% (0.83 in FIG. 7). When the folding part has a curvature R of about 0.3 mm, the light guide efficiency (%) of the folding part is about 95% (0.95 in FIG. 7). When the folding part has a curvature R of about 0.4 mm, the light guide efficiency (%) of the folding part is about 98% (0.98 in FIG. 7). When the folding part has a curvature R of about 0.5 mm, the light guide efficiency (%) of the folding part is about 99% (0.99 in FIG. 7). When the folding part has a curvature R of about 1 mm, the light guide efficiency (%) of the folding part is about 100% (1.00 in FIG. 7).

Here, it can be seen that since an amount of light lost in the folding part decrease as the curvature R of the folding part increases, the light guide efficiency (%) of the folding part gradually increases. As a result, when a ratio of the curvature R of the folding part to the thickness T of the light guide film is equal to or greater than about 10, the amount of light lost in the folding part may be minimized.

Also, the increase in the curvature R of the folding part allows a cross-sectional thickness of a side surface of the light guide film to be minimized. Accordingly, since the cross-sectional thickness of the side surface of the light guide film is minimized, the side thickness of the display apparatus at which the side surface of the light guide film is disposed may be reduced by maximizing the curvature R of the folding part. As the side thickness of the display apparatus is reduced, an overall thickness of the display apparatus is decreased and visual effect on a curved shape of the display apparatus may be maximized.

One or more exemplary embodiments of a display apparatus according to the invention may have a relatively slim cross-sectional thickness at a side surface thereof. Also, the display apparatus having the relatively slim cross-sectional thickness at the side surface thereof according to the invention may enhance the display quality of the curved display apparatus.

Although exemplary embodiments of the invention have been disclosed, various changes and modifications may be made thereto by one skilled in the art without departing from the scope and spirit of the invention as set forth in the appended claims.

Therefore, the detailed description of the invention does not intend to limit the invention to the disclosed exemplary embodiments. Further, the scope of the invention should be defined by the following claims.

What is claimed is:
1. A display apparatus comprising:
   a display panel which is curved and displays an image; and
   a backlight unit which generates and provides light to the display panel,
   wherein the backlight unit comprises:
      a light guide film which defines:
         a light emission part thereof facing the display panel,
         a folding part thereof extending from the light emission part to be folded in a folded state of the light guide film, and
         a light incident part thereof extending from the folding part to face the display panel with the light emission part therebetween,
         the light incident part extended at a first end thereof from the folding part and defining a light incident surface of the light guide film at a second end of the light incident part opposite to the first end thereof; and
      a light source unit overlapped with the light emission part defined by the light guide film to face the light incident surface of the light guide film defined by the light incident part thereof.

2. The display apparatus of claim 1, wherein the light source unit comprises:
   a plurality of light sources, each of which generates and emits the light through an emission surface thereof, and
   a printed circuit board on which the plurality of light sources is mounted,
   wherein the emission surface faces the light incident surface of the light guide film which is defined by the light incident part thereof.

3. The display apparatus of claim 2, wherein the folding part defined by the light guide film comprises:
   a first folding part connected to a first end of the light emission part; and
   a second folding part connected to a second end of the light emission part opposite to the first end thereof.

4. The display apparatus of claim 3, wherein the light incident part defined by the light guide film comprises:
   a first light incident part extending at a first end thereof from the first folding part to be overlapped with the light emission part; and
   a second light incident part extending at a first end thereof from the second folding part to be overlapped with the light emission part,
   wherein a second end of the second light incident part opposite to the first end thereof is spaced apart from a second end of the first light incident part opposite to the first end thereof.

5. The display apparatus of claim 4, wherein the light source unit is disposed between the second ends of the first light incident part and the second light incident part which are spaced apart from each other.

6. The display apparatus of claim 4, wherein the light incident surface of the light guide film defined by the light incident part thereof comprises:
   a first light incident surface defined by a second end surface of the first light incident part; and
   a second light incident surface defined by a second end surface of the second light incident part,
   wherein the first light incident surface and the second light incident surface are spaced apart from each other and face each other.

7. The display apparatus of claim 6, wherein the light source unit comprises:
   a first light source unit which generates and provides first light to the first light incident surface; and
   a second light source unit disposed between the second light incident surface and the first light source unit, wherein the second light source unit generates and provides second light to the second light incident surface.

8. The display apparatus of claim 1, wherein the backlight unit further comprises a reflection sheet facing the light emission part which is defined by the light guide film,
wherein the reflection sheet facing the light emission part which is defined by the light guide film is disposed between the light emission part and the light incident part which is defined by the light guide film and between the light emission part and the light source unit.

9. The display apparatus of claim 8, wherein the reflection sheet has a shape which is curved along a shape of the light emission part which is defined by the light guide film.

10. The display apparatus of claim 1, wherein the light emission part and the light incident part which are defined by the light guide film each have a shape which is curved along a shape of the display panel.

11. The display apparatus of claim 1, wherein
the backlight unit further comprises a reflection sheet facing the light emission part which is defined by the light guide film, and
the light emission part which is defined by the light guide film defines:
a light emission surface of the light guide film through which light is emitted from the light guide film, the light emission surface facing the display panel; and
an opposite surface of the light guide film opposite to the light emission surface thereof, the opposite surface contacting the reflection sheet,
wherein a light guide pattern is defined at the opposite surface of the light emission part.

12. The display apparatus of claim 11, wherein the light guide pattern is a groove recessed from the opposite surface of the light emission part.

13. The display apparatus of claim 1, wherein the light guide film has flexibility.

14. The display apparatus of claim 1, wherein
the folding part which is defined extending from the light emission part to be folded has a curvature,
the light guide film has a thickness in a cross-section thereof, and
a ratio of the curvature of the folding part to the thickness of the light guide film is equal to or greater than about 10.

15. The display apparatus of claim 1, further comprising a bottom chassis which accommodates the backlight unit therein and is curved along a shape of the display panel.

16. The display apparatus of claim 15, wherein the bottom chassis comprises:
a bottom part facing the display panel; and
a sidewall part bent from the bottom part and facing the folding part.

17. The display apparatus of claim 15, wherein the backlight unit further comprises a reflection member disposed between the bottom chassis and the light source unit, the reflection member which is disposed between the bottom chassis and the light source unit having a shape which is curved along the shape of the display panel.

* * * * *